United States Patent [19]

Kobayashi et al.

[11] Patent Number: 5,031,736
[45] Date of Patent: Jul. 16, 1991

[54] COLUMN-MOUNTED GEAR SELECTOR MECHANISM FOR AUTOMATIC TRANSMISSION

[75] Inventors: Satoshi Kobayashi, Hiratsuka; Motohiro Saito, Kosai, both of Japan

[73] Assignees: Nissan Motor Co., Ltd.; Fuji Kiko Co., Ltd., both of Japan

[21] Appl. No.: 515,008

[22] Filed: Apr. 26, 1990

[30] Foreign Application Priority Data

May 8, 1989 [JP] Japan .................... 1-115440

[51] Int. Cl.$^5$ ............................................. B60K 41/26
[52] U.S. Cl. .................... 192/4 A; 74/483 R; 74/483 K; 180/271; 200/61.88
[58] Field of Search ............ 192/4 R, 4 A, 4 C; 74/473 R, 473 SW, 483 R, 483 K; 180/271; 200/61.88

[56] References Cited

U.S. PATENT DOCUMENTS

| | | | |
|---|---|---|---|
| 2,875,640 | 3/1959 | Huso | 192/4 A X |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |

FOREIGN PATENT DOCUMENTS 1203756 4/1986 Canada .................. 192/4 A
60-185750 9/1989 Japan .

Primary Examiner—Richard Lorence
Attorney, Agent, or Firm—Lowe, Price, LeBlanc & Becker

[57] ABSTRACT

A column-mounted gear selector mechanism for an automatic transmission includes a locking lug installed on a control rod and is engageable with a catch lever so as to lockingly hold the control rod when the control rod is in a "parking" position, i.e., when a parking switch is turned on and either of an ignition switch and a brake switch is turned off. The locking lug has side surfaces opposed in a longitudinal direction of a vehicle body. A switch actuator is provided which has a first arm placed on one of the side surfaces of the locking lug to be secured to same and a second arm extending in a longitudinal direction of the vehicle body. The parking switch has a movable contact which is elongated in a lateral direction of the vehicle body so as to be engageable with the second arm of the switch actuator.

5 Claims, 3 Drawing Sheets

COLUMN-MOUNTED GEAR SELECTOR MECHANISM FOR AUTOMATIC TRANSMISSION

BACKGROUND OF THE INVENTION

1. Field of the Invention

The present invention relates in general to an automatic transmission control and, more particularly, to a gear selector mechanism for an automatic transmission.

2. Description of the Prior Art

An example of a prior art column-mounted gear selector mechanism for an automatic transmission is disclosed in Japanese Utility Model Provisional Publciation No. 60-185750 and is also shown in FIGS. 4 and 5 hereof.

The known gear selector mechanism includes a bracket 1 in the form of a planar plate secured with bolts 1a to a vehicle body panel 26 as a dash board, a steering column assembly 2 supported on the bracket 1 and a control rod 3 disposed in parallel relation to the steering column assembly 2 and rotatably and axially movably supported on same. The control rod 3 is provided with a locking lug 4 projecting radially outwards therefrom. The control rod 3 is further provided with a position guide 5 which is disposed lower than the bracket 1, i.e., on the engine compartment side of the bracket 1. In this connection, the locking lug 4 is disposed on the passenger compartment side of the bracket 1.

A catch lever 7 is disposed on the passenger compartment side of the bracket 1 and is swingably installed on same. The catch lever 7 is formed with an opening 8 for locking engagement with the locking lug 4. A position plate 9 is disposed on the engine compartment side of the bracket 1 and formed with cuts for defining a parking position "P", a neutral position "N", a drive position "D", a second gear position "S" and a first gear position "F" for the control rod 3 and is operatively connected with the position guide 5.

A shift lever 10 is provided for moving the control rod 3 into selected one of the gear positions through movement of the position guide 5 into selected one of the gear positions in the position plate 9. When the control rod 3 is in the parking position, the locking lug 4 is engaged in the opening 8 of the catch lever 7 while pushing a movable contact 12 of a parking switch 11 which is disposed in front of the locking lug 4 and thus turning on the parking switch 11 to indicate that the control rod 3 is in the parking position. The catch lever 7 is disengaged from the locking lug 4 when the control rod 3 is in the parking position and both an ignition switch 28 and a foot brake switch 30 are turned on to energize a solenoid 13 which is installed on the passenger compartment side of the bracket 1. When this is the case, a solenoid pin 13a of the solenoid 13 retracts to pull an arm 7a of the catch lever 7, thus turning the catch lever 7 from the solid line position to the two-dot chain line position in FIG. 5.

A steering wheel 14 is installed on the steering column assembly 2. A select lever 15 is installed on the lower end of the control rod 3 and operatively connected to an automatic transmission control unit 32 for performing shifting of gear in response to variation in the gear position of the control rod 3.

In the foregoing structure, the locking lug 4, etc., are required to be thick enough so as not to be deformed to move into a gear position other than the parking position even when the control rod 3 is forcibly rotated to do so. This however results in increased cost and weight. Further, since the movable contact 12 of the parking switch 11 is disposed so as to extend radially of the control rod 3 and be driven by the locking lug 4 in the same direction, the parking switch 11 is inevitably disposed far away from the control rod 3, resulting in a considerable distance 1 between the control rod 3 and the parking switch 11 and therefore a difficulty in layout of the parking switch 11.

SUMMARY OF THE INVENTION

In accordance with the present invention, there is provided a column-mounted gear selector mechanism for an automatic transmission. The mechanism comprises a control rod axially movably and rotatably installed on a vehicle body so as to be shiftable into various gear positions including a parking position, a locking lug installed on the control rod to move together therewith and having horizontally opposed side surfaces, a parking switch installed on the vehicle body so as to be turned on when the control rod is in the parking position, a catch lever swingably installed on the vehicle body and formed with an opening for locking engagement with the locking lug solenoid means operatively connected with said catch lever, said parking switch, an ignition switch and a foot brake switch for driving said catch lever into a first position when said parking switch is turned on and either of the ignition switch and foot brake switch is tuirned off and into a second position when said parking switch is turned on and both of said ignition switch and said foot brake switch are turned on, the catch lever, when in the first position, being engaged with the locking lug to lockingly hold the control rod in the parking position and, when in the second position, disengaged from same to allow axial movement and rotation of the control rod, and a switch actuator angled to have a first arm placed on one of the side surfaces of the locking lug to be secured to same and a second arm extending horizontally away from said first arm, the first arm being engageable in the opening of the catch lever together with the locking lug, the parking switch being pushed down and thereby turned on by the second arm of the switch actuator when the control rod is in the parking position.

The above structure is effective for solving the above noted problem inherent in the prior art device.

It is accordingly an object of the present invention to provide an improved gear selector mechanism which is light in weight and compact in size.

It is a further object of the present invention to provide an improved gear selector mechanism of the above described character which makes it possible to form locking elements from a thinner plate or plates.

It is a further object of the present invention to provide an improved gear selector mechanism of the above described character which can increase the freedom in layout of a parking switch.

DESCRIPTION OF THE PREFERRED EMBODIMENTS

Figure 1:
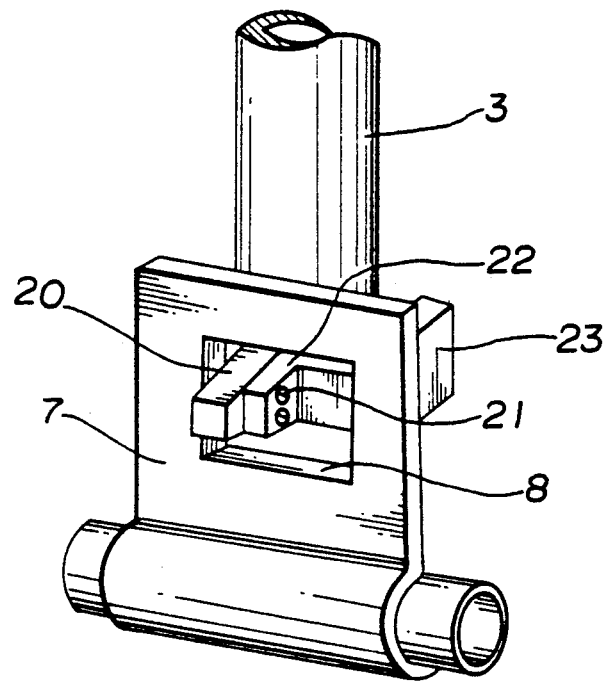
FIG. 1 is a perspective view of a principal portion of a gear selector mechanism according to an embodiment of the present invention.
Figure 3:
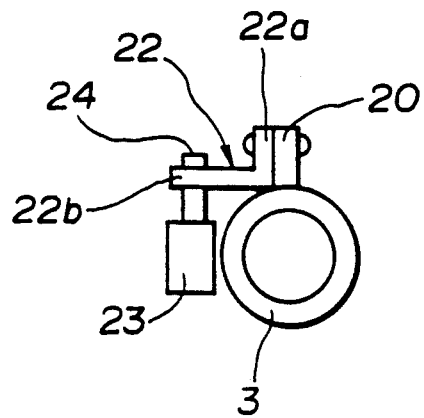
FIG. 3 is a plan view taken in the direction of the arrow III in FIG. 2.
Figure 5:
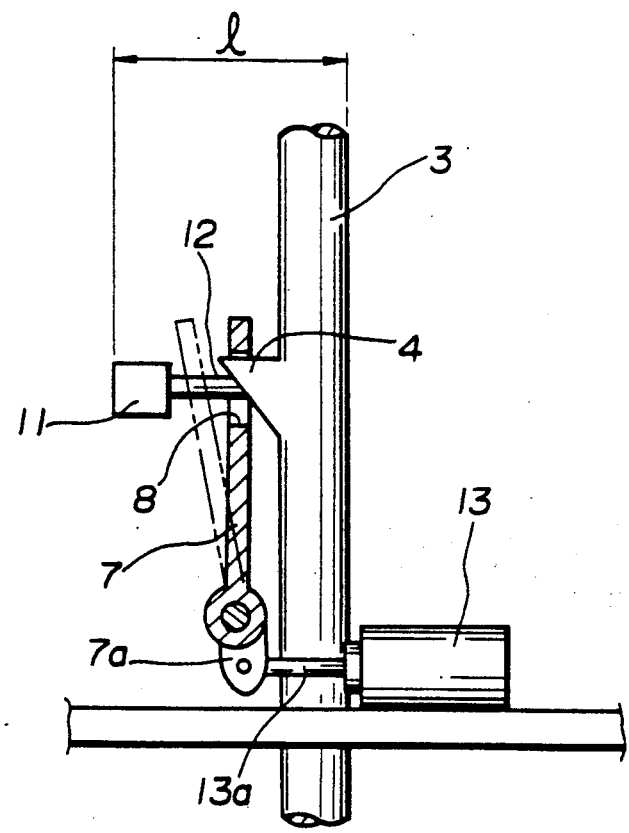
FIG. 5 is a side elevational view taken in the direction of arrow V in FIG. 4.
Figure 4:
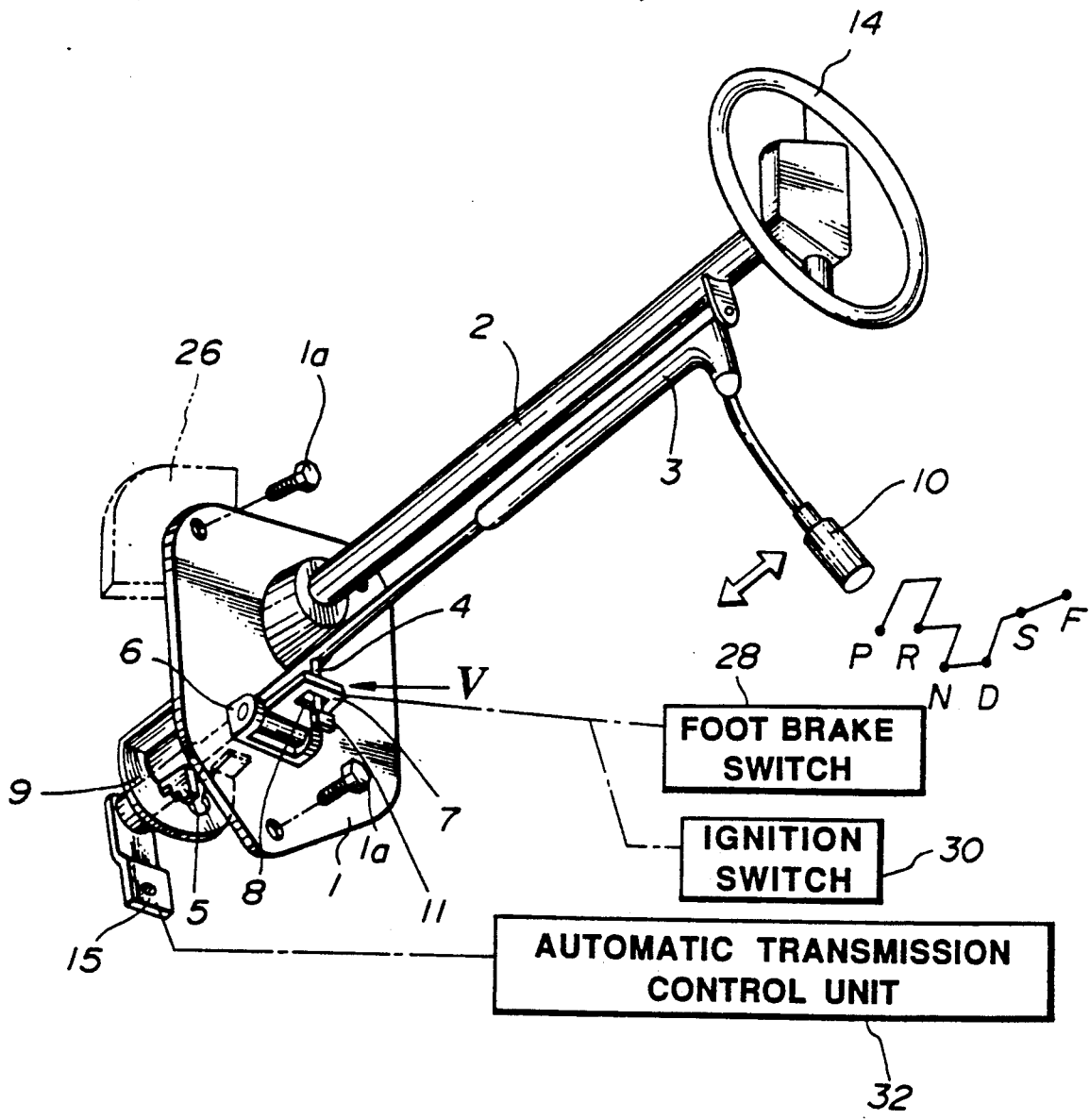
FIG. 4 is a perspective view of a prior art gear selector mechanism.

A gear selector mechanism according to a preferred embodiment of the present invention will now be described with reference to FIGS. 1 to 3, in which parts and portions like or corresponding to those of the prior art mechanism of FIGS. 4 and 5 are designated by the same reference characters and repeated description thereto is omitted for brevity.

A locking lug 20, in the form of a tooth-like projection and formed from a thin plate, is integrally secured to the control rod 3 to project therefrom in a lateral direction of the vehicle body or in the vehicle width direction. The locking lug 20 is engageable in the opening 8 of the catch lever 7 which is swingably installed on the vehicle body 26 similarly to the conventional. The locking lug 20 has vertical side surfaces opposed in a longitudinal direction of the vehicle body.

A switch actuator 22 of having a generally L-like shape is disposed so as to have a first arm 22a placed on the rear side surface of the locking lug 20 and secured to same with screws 21. The switch actuator 22 further has a second arm 22b extending rearwardly from the first arm 22a. The locking lug 20 and the first arm 22a of the switch actuator 22 are both adapted to engage in the opening 8 of the catch lever 7 and sustain a load directed axially of the control rod 3 for thereby preventing axial movement of the control rod 3. More paticularly, the locking lug 20 and the first arm 22a of the switch actuator 22 have respective upper edges which are disposed in the same plane such that the upper edges of the locking lug 7 and the first arm 22a of the switch actuator 22 are engageable with a corresponding edge of the opening 8 of the catch lever 7 at the same time. By this, it becomes possible to reduce the force to which the upper edge of the locking lug 20 is subjected when the control rod 3 is inadvertently driven axially thereof. Similarly, the locking lug 20 and the first arm 22a of the switch actuator 22 have respective lower edges which are disposed in the same plane such that the lower edges of the locking lug 20 and the first arm 22a of the switch actuatotr 22 are engageable with a corresponding edge of the opening 8 of the catch lever 7 at the same time.

Figure 2:
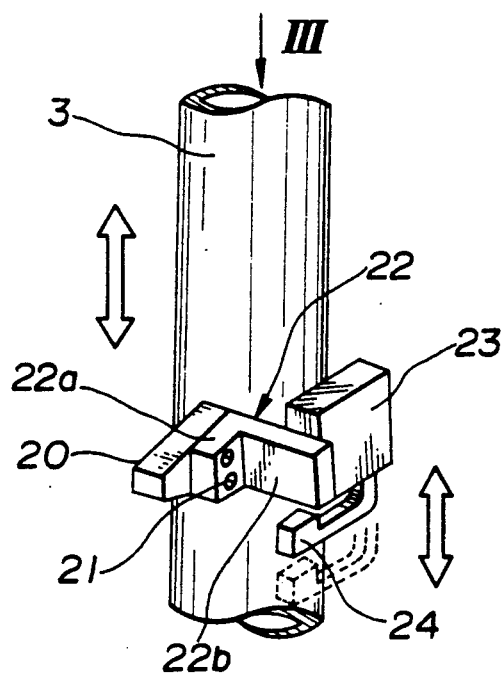
FIG. 2 is a perspective view similar to FIG. 1 but shows the mechanism with some parts being omitted.

A parking switch 23 has a movable contact 24 which is movable between an upper position and a lower position, i.e., between the solid line position and the two-dot chain line position in FIG. 2. The parking switch 23 is turned on when the movable contact 24 is pushed down into the lower position by the second arm 22b of the parking switch 23 when the control rod 3 is in the parking position, i.e., the associated automatic transmission of known type is in the parking position or range. A foot brake switch 28 is operatively connected to the catch lever 7 and adapted to be turned on when a foot brake of known type is fully depressed. An ignition switch 30 is operatively connected to the catch lever 7 and adapted to be turned on when an ignition key of known is turned into an "ON" position.

In operation, when the control rod is in the parking position, i.e., the parking switch 23 is turned on but either of the ignition switch 30 and the foot brake switch 28 is not turned on, locking engagement of the catch lever 7 and the locking lug 20 is maintained, thus making it imposible to shift the control rod 3 out of the gear positon.

When the parking switch 23 is turned on and both the the ignition switch 30 and the foot brake switch 28 are turned on, the solenoid 13 is energized, thus causing the catch lever 7 to swing into a position where it is disengaged from the locking lug 20. By this, the control rod 3 becomes axially movable and rotatable, out of the parking position, into a desired gear position, i.e., it becomes possible to perform shifting of gear out of a "Parking" into a desired gear position. When the control rod 3 is shifted into a desired gear position other than the parking position, the movable contact 24 of the parking switch 23 becomes out of contact from the second arm 22b of the switch actuator 22 and is moved into the upper position to indicate that the control rod 3 is not in the parking position.

When the control rod 3 is moved from a certain gear position into the parking position, the second arm 22b of the switch actuator 22 is moved into the position where it pushes down the movable contact 24 of the parking switch 23, thus turning on the parking switch 23 to indicate that the control rod 3 is in the parking position. When the control rod 3 is in the parking position and either of the ignition switch 30 and the foot brake switch 28 is turned off, the solenoid 13 is deenergized to cause the solenoid pin 13a to project under the bias of a built-in spring (not shown), thus causing the catch lever 7 to swing into a position where the locking lug 20 is engaged in the opening 8 of the catch lever 7, thus lockingly holding the control rod 3 in the parking position.

From the foregoing, it will be understood that both of the members adapted to push the movable contact 24, i.e., both the locking lug 20 and the switch actuator 22 are adapted to function properly and assuredly even when formed from a thin plate or plates, thus making it possible to reduce the weight of the gear selector mechanism.

It will be further understood that the parking switch 23 can be disposed in close proximity to the control rod 3, thus making it possible to increase the freedom in layout of the parking switch 23.

It will be further understood that due to the parking switch 23 disposed adajcent the control rod 3 the gear selector mechanism can be compact in size.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein:

What is claimed is:

1. A column-mounted gear selector mechanism for an automatic transmission, comprising:
    a control rod axially movably and rotatably installed on a vehicle body so as to be shiftable into various gear positions including a parking position;
    a locking lug installed in said control rod to move together therewith and having horizontally opposed side surfaces;
    a parking switch installed on the vehicle body so as to be turned on when said control rod is in the parking position;
    a catch lever swingably installed on the vehicle body and formed with an opening for locking engagement with said locking lug;

solenoid means operatively connected with said catch lever, said parking switch, an ignition switch and a foot brake switch, for driving said catch lever into a first position when said parking switch is turned on and either of the ignition switch and foot brake switch is turned off and into a second position when said parking switch is turned on and both of said ignition switch and said foot brake switch are turned on;

said catch lever, when in said first position, being engaged with said locking lug to lockingly hold said control rod in the parking position and, when in said second position, disengaged from same to allow axial movement and rotation of said control rod; and a switch actuator angled to have a first arm placed on one of said side surfaces of said locking lug to be secured to same and a second arm extending horixontally away from said first arm;

said first arm being engageable in said opening of said catch lever together with said locking lug;

said parking switch being pushed down and thereby turned on by said second arm of said switch actuator when said control rod is in the parking position.

2. A column-mounted gear selector mechanism according to claim 1, wherein:

said side surfaces of said locking lug are opposed in a longitudinal direction of the vehicle body, and said second arm of said switch actuator extends away from said first arm in a lateral direction of the vehicle body.

3. A column-mounted gear selector mechanism according to claim 2, wherein:

said locking lug and said first arm of said switch actuator have respective upper edges which are disposed in the same plane such that said upper edges of said locking lug and said first arm of said switch actuator are engageable with a corresponding edge of said opening of said catch lever at the same time.

4. A column-mounted gear selector mechanism according to claim 3, wherein:

said locking lug and said first arm of said switch actuator have respective lower edges which are disposed in the same plane such that said lower edges of said locking lug and said first asrm of said switch actuator are engageable with a corresponding edge of said opening of said catch lever at the same time.

5. A column-mounted gear selector mechanism according to claim 4, wherein:

said parking switch has a movable contact which is movable between an upper position where said parking switch is turned off and a lower position where said parking switch is turned off and a lower position where said parking switch is turned on, said movable contact being elongated in a longitudinal direction of the vehicle body so as to be pushed down by said second arm of said switch actuator and moved into said lower position when said control rod is in the parking position.

* * * * *